Figure 1:
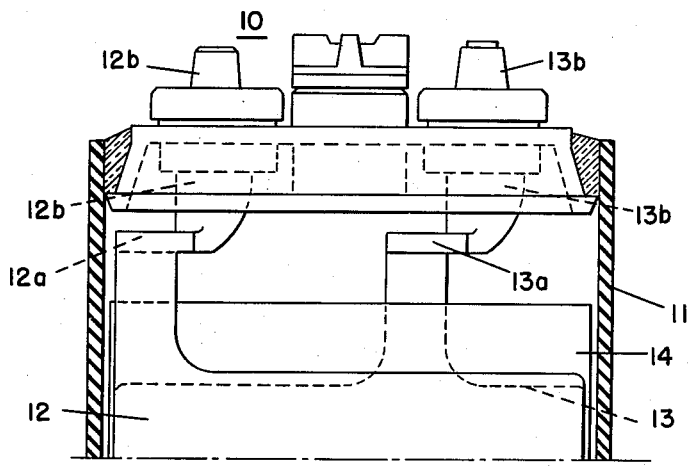

May 11, 1954 — H. STOERTZ — 2,678,340

STORAGE BATTERY GRID COMPOSITION

Filed Dec. 19, 1951

INVENTOR.
HOWARD STOERTZ
ATTORNEY

Patented May 11, 1954

2,678,340

UNITED STATES PATENT OFFICE 2,678,340

STORAGE BATTERY GRID COMPOSITION

Howard Stoertz, Philadelphia, Pa., assignor to The Electric Storage Battery Company, a corporation of New Jersey Application December 19, 1951, Serial No. 262,393

6 Claims. (Cl. 136—65)

The invention relates to improvements in storage batteries of the lead-acid type and particularly to the grid composition of the plates which composition not only provides an increased life of the positive plates but also makes possible reduced local action in the negative plates with a plate-life unexpectedly high.

It is an object of the present invention to provide improved storage batteries in which the positive grids, their straps, and their associated posts are rendered less susceptible to electrochemical attack, thereby increasing the life of the battery.

Storage battery grids of the type used in lead-acid batteries are commonly formed of lead-antimony alloys containing from 6% to 8% antimony, with tin from around 0.15% to about 0.5% along with minor amounts of other metals present as impurities. When such storage batteries are charged, it is common practice to leave them "on the line" for a period somewhat longer than necessary to bring them up to a maximum or fully charged condition. During overcharge, the material of the positive grids is particularly subject to electrochemical attack. A part of the antimony is removed from the positive grids and their associated straps and posts and is deposited on the negative plates. This action occurs as the result of electrochemical attack resulting in oxidation of antimony and possibly of other metals (copper or nickel as impurities) present in the positive grids and associated structure. The oxides so formed dissolve in the electrolyte to form salts, some of which decompose at the negative plates with deposition on them of metallic antimony or other metal in a particularly active form.

Local action takes place between the metals so deposited on the negative plates and the active material of such plates to their detriment. The local action, which may also affect the negative straps and posts, is one of the causes of ultimate failure of batteries of the lead-acid type, whether on cycle or float service.

In accordance with my co-pending application Serial No. 390,469 filed November 5, 1953 which is a continuation of my application Serial No. 197,128, filed November 22, 1950, there is disclosed improvement in the life of a storage battery resulting from plates formed from lead-arsenic-antimony alloys which, as set forth in my disclosure in that application, exhibit greatly increased resistance to anodic attack compared with conventional lead-antimony alloys.

In accordance with the disclosure of U. S. Patent 2,333,072 dated October 26, 1943, it is pointed out that silver when included as an alloying ingredient in lead-antimony mixtures provides an increased life, the suggested range of silver being disclosed as from 0.04% to 0.60% by weight.

In accordance with the present invention it has been found that if there be present both arsenic and silver together with lead and antimony as alloying components of the metal from which the positive and negative grids, posts, and straps of the battery are made, battery life is increased or extended beyond that which might be predicted due to the sum of the contributing effects of arsenic alone or of silver alone. Further in accordance with the present invention it has been found that the life-lengthening factors resulting respectively from the added arsenic and added silver are expressed by parabolic curves exhibiting peaks at certain percentages by weight of their values in the alloys. Thus in accordance with the present invention greatly improved battery life is achieved even for relatively low percentages of concurrently added arsenic and silver.

Figure 2:
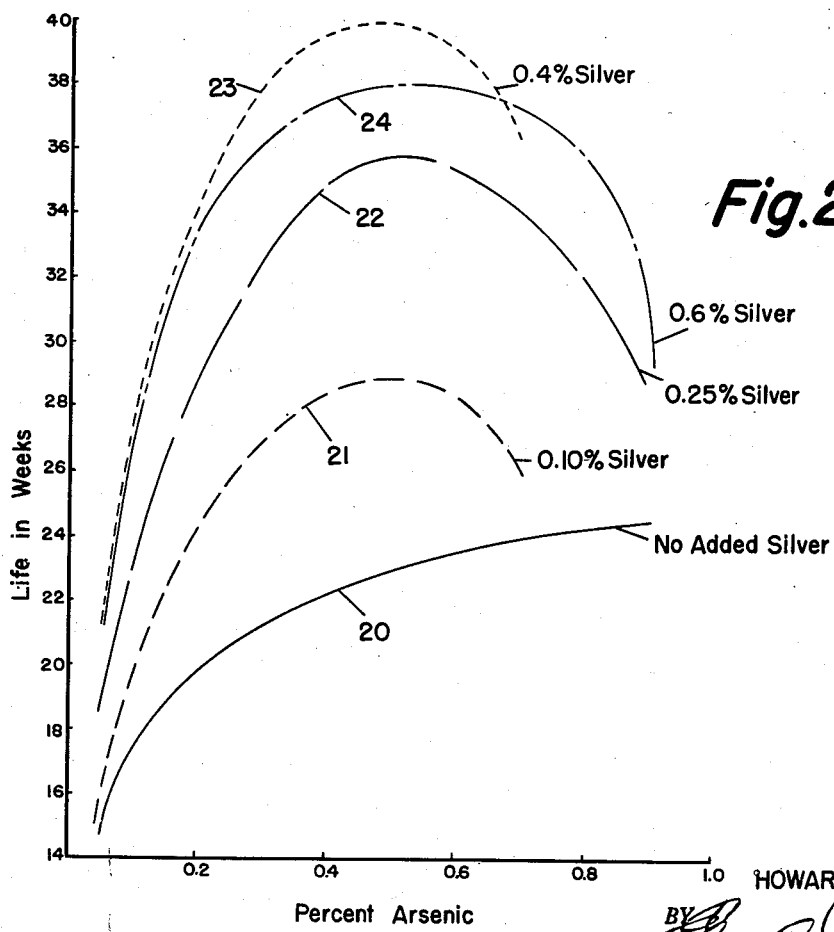

Other advantages are attained by the concurrent presence in the battery plate alloy of arsenic and silver and these further advantages will be fully explained in the more detailed description which follows and with reference to the accompanying drawing in which:

Fig. 1 is a fractional sectional view of a typical lead-acid storage battery to which the invention has been applied; and Fig. 2 is a graph illustrating arbitrary units of life as ordinates, arsenic in per cent. by weight as abscissa, and various values of silver respectively corresponding with each of the curves illustrated.

Referring to the drawing, a fractional part of a storage battery 10 has been illustrated comprising the usual insulating container 11 with a series of negative plates 12 secured together by a strap 12a from which there extends through the cover of container 11 a post 12b. A series of positive plates 13 alternate with the negative plates 12, separators 14 being respectively interposed between each adjacent positive and negative plate. The anodic structure comprising the positive plates 13, their straps 13a and associated post 13b is, of course, to a substantial degree immersed within the electrolyte, generally sulphuric acid, the optimum level of electrolyte being just above the edges of the separators 14. Thus, it will be seen that in mobile applications the straps and posts of each cell of the storage battery will be subject to the anodic electrochemical attack above described, with resultant deposition of antimony on the negative plates. By utilizing plates made from alloys within the scope of the present invention anodic attack is greatly lessened.

The straps and posts of stationary batteries will also be subject to attack due to droplets of electrolyte carried to them as a result of evolution of gas within the cell and/or the creepage of the electrolyte upon portions of the anodic structure exposed thereto.

In accordance with the present invention, I have found that by making the anodic structure as a whole, particularly the grids and other portions exposed to the electrolyte, of a lead-antimony-arsenic-silver alloy, there is materially greater resistance to anodic attack, the enhancement of this property resulting in a substantially longer life of the battery.

In accordance with the present invention, the anodic structure including the grids and their associated straps and posts may comprise alloys within the following range:

| Antimony | Arsenic | Silver | Lead |
| --- | --- | --- | --- |
| From about 4% to about 8%. | Upwardly from about 0.15% and preferably below about 2.5%. | Upwardly from about 0.04% and preferably below about 0.6%. | The remainder, except for a small amount of added metals heretofore used, such as tin and minor impurities. |

Certain conclusions may be drawn as a result of a series of over-charge tests, the results of which appear in summary form in Fig. 2. The tests were conducted with automotive type batteries containing 17 plates and rated at a capacity of 110 ampere hours under the following conditions:

Charge at 8.3 amperes for 98 hours. Stand on open circuit for 65½ hours. Discharge at 15.2 amperes for a minimum of 3½ hours to a final voltage of 5.1 volts. Stand on open circuit for 1 hour and then repeat.

If, over a two-week period, a battery failed either to deliver a discharge current of 15.2 amperes for the full 3½ hour period, or at the end of the 3½ hour period the final voltage was less than 5.1 volts, it was known that the battery had reached the end of its useful life. Subsequent inspection of such batteries confirmed the criteria of the tests. Corrosion of the anodic structure, particularly the grids, had progressed to a point where active material from the positive grids was found at the bottom of the battery case. Some of the ribs of the grids were broken with a resulting increase in the internal resistance of the battery due to the lower conductivity of the grids. The negative plates of the batteries used in the tests were, in general, in reasonably good condition, not having attained the end of their useful lives.

The results of the test (for a selected constant value of antimony of 6.0%) can be expressed by the following formula:

Weeks = $7.2 + 58.9 \times$ (percent of arsenic) $- 53.0 \times$ (percent of arsenic)$^2 + 75.1 \times$ (percent of silver) $- 86.6 \times$ (percent of silver)$^2$ The formula is a mathematical way of expressing the results of the tests made. In using the formula it is necessary to take into account many variables such as necessarily arise from laboratory testing methods and variables over which control may not be perfectly exercised. That the formula may be considered fairly accurate in view of the nature of tests is evident from the fact that the well-known standard of error estimate for the above formula is of the order of about 2.2 weeks.

It is believed sufficient experimental work has been done to justify the application of the above formula to the arsenic-silver-lead alloys with antimony present in the range from about 4% to about 8% by weight, it being understood that the coefficients A, B, C and D representing antimony present in amount other than about 6%, will numerically differ from their corresponding values in the above equation; namely, 58.9, 53.0, 75.1 and 86.6, such values being constant for any given percentage of antimony.

From the formula itself, it will be seen that the life of the battery is determined by the sum of two parabolic variables, one for arsenic and one for silver. The parabola from which extended life can be ascertained due to the addition of arsenic (always in the presence of silver) indicates a gradual increase in life with added arsenic up to a peak, followed by a gradual decrease in battery life with arsenic added above about 0.5%. On the other hand, the parabola representing the increase in battery life with added silver (always in the presence of added arsenic) shows a more rapid increase in life with added silver until a peak is reached at about 0.4%, followed by a decrease in life with addition of silver in greater amount.

The presence in the formula of the two factors which determine the foregoing parabolas is to be contrasted with factors expressive of added life where silver in the absence of arsenic is utilized or arsenic in the absence of silver is utilized. In the latter cases the increase in battery life can be expressed by linear relationships as is evident from graph 20; and the increase in life resulting from added silver in the absence of arsenic or added arsenic in the absence of silver is of a much lower order than is obtained in accordance with the present invention.

Again referring to Fig. 2, the graph 20 illustrates for a 6% antimony alloy the change in life with arsenic varying from 0.05% to about 0.9% without added silver (the statement "without added silver" means that silver may be present as an impurity but in amount generally less than 0.03% by weight). The reasons for the increase in life with added arsenic have been fully set forth in my said application Serial No. 197,128 and its continuation Serial No. 390,469 and the improved results there set forth are believed to represent an advance in the art.

The graph 21 illustrates the increase in life with change in arsenic where the alloy includes silver in quantity equal to about 0.1% by weight. It will be seen that as the arsenic content increases there is a rapid increase in the life of the battery with a maximum occurring for the value of arsenic equal to 0.5% by weight beyond which the life of the battery decreases. However, every point of the graph 21 is above that of the graph 20, indicating an improvement throughout the illustrated range. For an alloy including silver of 0.25%, graph 22, the increase in battery life is quite pronounced, the peak again occurring at 0.5% arsenic. The greatest increase in life, as illustrated by the graph 23, occurs with an alloy including silver present in amount 0.4% by weight.

With silver present in as high an amount as 0.60% there was again exhibited, graph 24, the peak or maximum at 0.5% arsenic but the battery life was somewhat less than for the alloy which included less silver, namely, 0.4% by weight.

From one aspect of the invention and in terms of increased battery life for 6% antimony alloys, a preferred range lies between about 0.2% arsenic and 0.7% arsenic, though 0.5% arsenic would, of course, be selected for the maximum battery life with silver present in the range of from about .04% to .6%, preferably about .4%. For alloys with increasing amounts of antimony, above 6% but always less than 8% the maxima corresponding with the respective maxima of graphs 21—24 might be displaced from those illustrated for the 6% antimony alloys. For example each maximum might well occur with somewhat lower values of arsenic. Similarly for alloys with lesser amounts of antimony than the 6%, the maximum may occur at somewhat higher arsenic values. For values of antimony somewhat higher than 6%, the maxima obtained for these various percentages of the arsenic and silver will likely occur with arsenic values somewhat below those of Fig. 2. While the maxima may be shifted to right or left, depending upon the amount of antimony, they will in any event fall within the preferred range indicated above. For any antimony percentage the relative value of the arsenic and silver will probably be changed very little.

Cost consideration will indicate a choice of a relatively low percentage of silver. Even though it be selected as low as 0.1% by weight, graph 21, nevertheless the increase in life is quite striking as compared with the ternary alloy of graph 20 where no silver has been added. An unexpected improvement will be realized with silver added in excess of its usual impurity-value of about 0.03%.

The following table is based upon experimental work and the data presented illustrate the unexpected life increment beyond that which could be reasonably predicted from the addition of either silver or arsenic to a 6.0% lead-antimony alloy:

the two metals are together added to the alloy the resultant increase in battery life is not what could be anticipated but may exceed the predictable increase by as much as 35.5%. With antimony present in amount somewhat less than 6% by weight, the percentage of unexpected life increment will tend to be even higher.

Not only does the combination of arsenic and silver increase the life of the batteries but the presence of silver reduces the evolution of stibine and arsine from the batteries, such gases being particularly undesirable when batteries must be used without adequate ventilation.

I claim:

1. A storage battery of the lead-acid type having positive and negative plates surrounded by electrolyte, characterized by a grid structure comprising a lead-antimony-arsenic-silver alloy in which the antimony lies within a range of from about 4% to about 8% by weight, the arsenic between about 0.15% and about 1%, silver between about 0.04% and 0.6%, and lead the remainder.

2. A storage battery of the lead-acid type having positive and negative plates surrounder by electrolyte, characterized by a grid structure comprising a lead-antimony-arsenic-silver alloy in which the antimony lies within a range of from about 4% to about 6% by weight, the arsenic between about 0.4% and about 0.7%, silver between about 0.1% and 0.6%, and lead the remainder.

3. A storage battery of the lead-acid type having positive and negative plates surrounded by electrolyte, characterized by an anode structure comprising a lead-antimony-arsenic-silver alloy in which the antimony lies within a range of from about 4% to about 6% by weight, the arsenic between about 0.3% and about 0.7%, silver between about 0.4% and 0.6%, and lead the remainder.

4. A storage battery of the lead-acid type having positive and negative plates surrounded by electrolyte, characterized by an anode structure comprising a lead-antimony-arsenic-silver alloy in which the antimony is about 6% by weight, the arsenic is about 0.5%, the silver about 0.1%, and lead the remainder.

5. A storage battery of the lead-acid type having positive and negative plates surrounded by electrolyte, characterized by an anode structure comprising a lead-antimony-arsenic-silver alloy in which antimony is present in an amount equal to about 6% by weight, and in which arsenic is present in an amount determined by the maximum representing a solution of the following parabolic relationship: $58.9 \times$ (percent of arsenic) —

| Percent As | Percent Ag | Time, Wks. | "F" Weeks gain from Ag | "G" Weeks gain from As | Predictable Life, 14.5+F+G | Actual Life, Weeks | Unexpected Increment | |
|---|---|---|---|---|---|---|---|---|
| | | | | | | | Wks. | Percent |
| [1]0.05 | [1]0.03 | 14.5 | ---- | ---- | ---------- | ---- | ---- | ---- |
| [1]0.05 | 0.25 | 18.5 | 4.0 | ---- | ---------- | ---- | ---- | ---- |
| [1]0.05 | 0.40 | 21.0 | 6.5 | ---- | ---------- | ---- | ---- | ---- |
| 0.30 | [1]0.03 | 20.5 | ---- | 6.0 | ---------- | ---- | ---- | ---- |
| 0.50 | [1]0.03 | 23.0 | ---- | 8.5 | ---------- | ---- | ---- | ---- |
| 0.30 | 0.25 | ---- | ---- | ---- | 24.5 | 30.5 | 6.0 | 24.5 |
| 0.50 | 0.40 | ---- | ---- | ---- | 29.5 | 40.0 | 10.5 | 35.5 |

[1] Impurity, maximum.

An examination of the above table demonstrates that, while the addition of silver alone or of arsenic alone increases battery life, when $53.0 \times$ (percent of arsenic)$^2$ and where silver is present in an amount determined by the maximum representing the solution of the parabolic relationship expressed by the following: $75.1 \times$ (percent of silver) $-86.6 \times$ (percent of silver)$^2$, and the remainder being lead.

6. A storage battery of the lead-acid type having positive and negative plates surrounded by electrolyte, characterized by a grid structure comprising a lead-antimony-arsenic silver alloy in which the antimony lies within a range of from about 4% to about 6% by weight, the arsenic between about 0.15% and about .5%, silver between about 0.04% and 0.1%, and lead the remainder.

References Cited in the file of this patent

UNITED STATES PATENTS

| Number | Name | Date |
|---|---|---|
| 2,305,133 | Campbell | Dec. 15, 1942 |
| 2,333,072 | Lightton | Oct. 26, 1943 |

OTHER REFERENCES

Fink et al., Transactions of Electrochemical Society, 1941, vol. 79, p. 269.